United States Patent
Drda et al.

(10) Patent No.: US 10,122,259 B2
(45) Date of Patent: Nov. 6, 2018

(54) OVER POWER PROTECTION FOR POWER CONVERTER

(71) Applicant: SEMICONDUCTOR COMPONENTS INDUSTRIES, LLC, Phoenix, AZ (US)

(72) Inventors: Vaclav Drda, Valasska Bystrice (CZ); Roman Stuler, Karolinka (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 110 days.

(21) Appl. No.: 15/042,357

(22) Filed: Feb. 12, 2016

(65) Prior Publication Data

US 2017/0077798 A1    Mar. 16, 2017

Related U.S. Application Data

(60) Provisional application No. 62/219,531, filed on Sep. 16, 2015.

(51) Int. Cl.
| | |
|---|---|
| *H02M 1/32* | (2007.01) |
| *H02M 3/337* | (2006.01) |
| *H02H 3/20* | (2006.01) |
| *H02M 1/00* | (2006.01) |
| *H02M 7/529* | (2006.01) |
| *H02M 3/157* | (2006.01) |
| *H02M 3/335* | (2006.01) |

(52) U.S. Cl.
CPC ........... *H02M 1/32* (2013.01); *H02M 3/3376* (2013.01); *H02M 3/157* (2013.01); *H02M 3/33515* (2013.01); *H02M 7/529* (2013.01); *H02M 2001/0012* (2013.01); *H02M 2001/0058* (2013.01); *Y02B 70/1433* (2013.01); *Y02B 70/1491* (2013.01)

(58) Field of Classification Search
CPC .. H02M 1/32; H02M 1/4241; H02M 3/33507; H02M 2001/0058; H02M 3/3376; H02M 2001/0032; H02M 3/33546; H02M 2001/0012; H02M 3/157; H02M 3/33515; H02M 7/529; Y02B 70/1433; Y02B 70/1491
USPC ............................ 323/283; 363/21.05, 21.13
See application file for complete search history.

(56) References Cited

U.S. PATENT DOCUMENTS

| | | | | |
|---|---|---|---|---|
| 5,317,240 | A * | 5/1994 | Keller | ...................... H04N 9/69 315/383 |
| 6,400,581 | B1 * | 6/2002 | Lee | ...................... H02M 3/157 363/21.01 |

(Continued)

OTHER PUBLICATIONS

Microchip Technology, Inc., "Switch Mode Power Supply (SMPS) Topologies (Part I)," AN1114 data sheet, 2007, 48 pages.
ST, "An introduction to LLC resonant half-bridge converter," AN2644 data sheet, Sep. 2008 [Rev 2], 64 pages.

*Primary Examiner* — Gary L Laxton
*Assistant Examiner* — Demetries A Gibson
(74) *Attorney, Agent, or Firm* — Dickinson Wright PLLC

(57) ABSTRACT

A power conversion circuit is provided. A power level of the power conversion circuit is determined by taking a first sample of a voltage potential of a resonant capacitor at a first time. A second sample of the voltage potential of the resonant capacitor voltage is taken at a second time. An electric current is determined based on the first sample and second sample.

20 Claims, 6 Drawing Sheets

(56) References Cited

U.S. PATENT DOCUMENTS

| | | | |
|---|---|---|---|
| 8,018,200 B2* | 9/2011 | Enjalbert | H02J 7/0052 |
| | | | 320/134 |
| 2002/0141226 A1* | 10/2002 | Kato | G11C 7/14 |
| | | | 365/149 |
| 2005/0168167 A1* | 8/2005 | Yu | H05B 41/2828 |
| | | | 315/244 |
| 2010/0099369 A1* | 4/2010 | Ozgun | H04B 1/0458 |
| | | | 455/125 |
| 2012/0281438 A1* | 11/2012 | Fang | H02M 3/33507 |
| | | | 363/21.12 |
| 2013/0343090 A1* | 12/2013 | Eom | H02M 3/33507 |
| | | | 363/16 |
| 2014/0078790 A1* | 3/2014 | Lin | H02M 3/33507 |
| | | | 363/21.16 |
| 2014/0286056 A1* | 9/2014 | Yoon | H02M 3/33569 |
| | | | 363/21.03 |
| 2015/0054421 A1* | 2/2015 | Auer | H05B 33/0809 |
| | | | 315/247 |
| 2015/0194896 A1 | 7/2015 | Stuler et al. | |
| 2015/0263629 A1* | 9/2015 | Stuler | H02M 3/33546 |
| | | | 363/21.02 |
| 2015/0340880 A1* | 11/2015 | Kdoshim | H02J 5/005 |
| | | | 307/104 |
| 2016/0190912 A1* | 6/2016 | Lim | G01R 21/006 |
| | | | 363/84 |
| 2016/0268912 A1* | 9/2016 | Wang | H02M 3/33546 |
| 2016/0308447 A1* | 10/2016 | Chen | H02M 1/4258 |

\* cited by examiner

OVER POWER PROTECTION FOR POWER CONVERTER

CLAIM TO DOMESTIC PRIORITY

This patent application claims the benefit of and priority to U.S. Provisional Application No. 62/219,531, filed Sep. 16, 2015, and entitled "OVER POWER PROTECTION FOR LLC CONVERTERS," which is incorporated herein by reference for all purposes.

BACKGROUND

Semiconductor devices are commonly found in modern electronic products. Semiconductor devices vary in the number and density of electrical components. Discrete semiconductor devices generally contain one type of electrical component, e.g., light emitting diode (LED), small signal transistor, resistor, capacitor, inductor, and power metal oxide semiconductor field effect transistor (MOSFET). Integrated semiconductor devices typically contain hundreds to millions of electrical components. Examples of integrated semiconductor devices include microcontrollers, microprocessors, and various signal processing circuits.

Semiconductor devices perform a wide range of functions such as signal processing, high-speed calculations, transmitting and receiving electromagnetic signals, controlling electronic devices, transforming sunlight to electricity, and creating visual images for television displays. Semiconductor devices are found in the fields of entertainment, communications, power conversion, networks, computers, and consumer products. Semiconductor devices are also found in military applications, aviation, automotive, industrial controllers, and office equipment.

FIG. 1 illustrates electronic device 50 having a chip carrier substrate or printed circuit board (PCB) 52 with a plurality of semiconductor packages mounted on a surface of the PCB. Electronic device 50 can have one type of semiconductor package, or multiple types of semiconductor packages, depending on the application. Different types of semiconductor packages are shown in FIG. 1 for purposes of illustration.

Electronic device 50 can be a stand-alone system that uses the semiconductor packages to perform one or more electrical functions. Alternatively, electronic device 50 can be a subcomponent of a larger system. For example, electronic device 50 can be part of a tablet, cellular phone, digital camera, television, power supply, or other electronic device. Electronic device 50 can also be a graphics card, network interface card, or other expansion card that is inserted into a personal computer. The semiconductor packages can include microprocessors, memories, application specific integrated circuits (ASIC), programmable logic circuits, analog circuits, radio frequency (RF) circuits, discrete devices, or other semiconductor die or electrical components.

In FIG. 1, PCB 52 provides a general substrate for structural support and electrical interconnect of the semiconductor packages mounted on the PCB. Conductive signal traces 54 are formed over a surface or within layers of PCB 52 using evaporation, electrolytic plating, electroless plating, screen printing, or another suitable metal deposition process. Signal traces 54 provide for electrical communication between each of the semiconductor packages, mounted components, and other external system components. Traces 54 also provide power and ground connections to each of the semiconductor packages. A clock signal is transmitted between semiconductor packages via traces 54 in some embodiments.

For the purpose of illustration, several types of first level packaging, including bond wire package 56 and flipchip 58, are shown on PCB 52. Additionally, several types of second level packaging, including ball grid array (BGA) 60, bump chip carrier (BCC) 62, land grid array (LGA) 66, multi-chip module (MCM) 68, quad flat non-leaded package (QFN) 70, quad flat package 72, embedded wafer level ball grid array (eWLB) 74, and wafer level chip scale package (WLCSP) 76 are shown mounted on PCB 52. Depending upon the system requirements, any combination of semiconductor packages, configured with any combination of first and second level packaging styles, as well as other electronic components, can be connected to PCB 52.

A manufacturer of electronic device 50 provides a power signal to the electronic device which is used to power the semiconductor packages and other devices disposed on PCB 52. In many cases, the provided power signal is at a different voltage than the voltage required to operate the individual semiconductor devices. The manufacturer will generally provide a power converter circuit on PCB 52 to generate a steady direct current (DC) voltage signal at a voltage potential level usable by the individual semiconductor packages. One topology that is commonly used for medium and high power converters is the series LLC resonant mode converter, which is a type of switch-mode power supply (SMPS).

A circuit diagram for one exemplary embodiment of an LLC resonant mode converter 100 is illustrated in FIG. 2a. LLC resonant mode converter 100 has a primary side 102 and a secondary side 104. Primary side 102 includes a voltage source 106, which is a DC voltage source. In one embodiment, voltage source 106 is an AC main line distributed by a power company or municipality to a power outlet at a user's home or office that is rectified to DC, e.g., by a diode bridge. Voltage source 106 is coupled between ground node 108 and circuit node 110. Primary side 102 also has high side MOSFET 112 with a drain terminal coupled to circuit node 110, a gate terminal 114, and a source terminal coupled to MOSFET 116 at half-bridge (HB) node 122. Low side MOSFET 116 includes a drain terminal coupled to the source terminal of MOSFET 112 at HB node 122, a gate terminal 118, and a source terminal coupled to ground node 108.

Primary side 102 of LLC resonant mode converter 100 includes resonant inductor 128, resonant capacitor 136, and the primary side of transformer 130, including primary winding 132 and magnetizing inductance 134, coupled in series between HB node 122 and ground node 108. Resonant inductor 128, primary winding 132, magnetizing inductance 134, and resonant capacitor 136 form an LLC tank for LLC resonant mode converter 100. A controller drives the LLC resonant tank formed by resonant inductor 128, primary winding 132, magnetizing inductance 134, and resonant capacitor 136 by turning MOSFETs 112 and 116 on and off alternatively using gates 114 and 118. A controller turns MOSFET 112 on by applying a positive voltage at gate terminal 114, and turns MOSFET 112 off by applying a ground voltage potential to gate terminal 114. A controller turns MOSFET 116 on by applying a positive voltage at gate terminal 118, and turns MOSFET 116 off by applying a ground voltage potential to gate terminal 118.

MOSFETs 112 and 116 are n-channel MOSFETs, indicating that negative carriers, or electrons, are the majority carrier for electric current through the MOSFETs. In other embodiments, p-channel MOSFETs are used that have positive electron holes as the majority carrier. An n-channel MOSFET provides low electrical resistance between a drain terminal and a source terminal of the n-channel MOSFET when a voltage potential of a gate terminal is sufficiently high. With the gate of the MOSFET at ground potential, or at least below a threshold, a larger electrical resistance is exhibited between the drain and source of the MOSFET.

In the ideal case, an n-channel MOSFET exhibits zero resistance when its gate has a positive voltage potential, and exhibits infinite resistance when its gate is at ground potential. MOSFETs 112 and 116 operate as switches which are opened and closed by control signals from a controller coupled to the MOSFETs' respective gates. A switch, e.g., MOSFETs 112 and 116, being closed is also referred to as the switch being "on," because electric current is able to flow between terminals of the switch. An open switch is referred to as being "off" because current does not flow significantly between terminals of the switch. While the switches of LLC resonant mode converter 100 are illustrated as MOSFETs, other types of electronically controlled switches, e.g., bipolar-junction transistors (BJTs), are used in other embodiments. MOSFETs include source and drain terminals, which are conduction terminals, and a gate terminal as a control terminal. BJTs include emitter and collector terminals, which are conduction terminals, and a base terminal as a control terminal.

When MOSFET 112 is on and MOSFET 116 is off, HB node 122 is coupled to a positive voltage at circuit node 110 through MOSFET 112. When MOSFET 116 is on and MOSFET 112 is off, HB node 122 is coupled to ground node 108 through MOSFET 116. The switching of MOSFETs 112 and 116 causes the voltage potential at HB node 122 to alternate between the voltage potential of voltage source 106 and ground potential. The pulsating voltage potential at HB node 122 causes resonant inductor 128, primary winding 132, magnetizing inductance 134, and resonant capacitor 136 to resonate.

Magnetizing inductance 134 is not an actual physical inductor, but is used in analysis to represent a portion of current through transformer 130 that is used to magnetize core 137. Energy is transferred from primary winding 132 to secondary winding 138 through magnetic coupling. A certain percentage of the power input to transformer 130, analyzed as the current through magnetizing inductance 134, is lost in core 137 because the core does not have a perfectly efficient magnetic response.

As HB node 122 toggles between ground voltage and the voltage potential of voltage source 106, power is transferred from primary winding 132 to secondary winding 138. A circuit node 152 is connected to secondary winding 138 as a center-tap. A secondary winding portion 138a is coupled between center tapped circuit node 152 and diode 142, while secondary winding portion 138b is coupled between center tapped circuit node 152 and diode 144. Diodes 142 and 144 rectify the current through secondary winding 138. Capacitor 146 is coupled between circuit node 150 and circuit node 152 to filter the voltage to a more steady DC voltage.

FIG. 2b illustrates timing diagrams of voltages and currents at various circuit nodes of LLC resonant mode converter 100 through a full power transfer cycle. Time is illustrated on the X, or horizontal, axis, and voltage or current magnitude is illustrated on the Y, or vertical, axis. Time is not labelled in units of time, but rather to distinguish between modes of operation of LLC resonant mode converter 100.

Signal 154 in FIG. 2b represents a signal generated by a controller integrated circuit (IC) and routed to gate 114 of MOSFET 112. Signal 154 goes from logic zero to logic one, or from ground voltage to a positive voltage, at time zero. Signal 154 at a positive voltage turns on MOSFET 112, which couples HB node 122 to the voltage at circuit node 110. Signal 154 returns to a logic zero, or ground potential, at time 2.

Signal 155 in FIG. 2b represents a signal generated by a controller IC and routed to gate 118 of MOSFET 116. Signal 155 transitions from a logic zero to a logic one at time 3, and returns to logic zero at time 5. Signal 155 at a positive voltage turns on MOSFET 116, which couples HB node 122 to ground node 108.

Primary current 156 in FIG. 2b is the total current through the primary side of transformer 130, i.e., the current through magnetizing inductance 134 summed with the current through primary winding 132. Magnetizing current 157 is the current through magnetizing inductance 134 that is used to magnetize core 137 of transformer 130. Beginning at time zero, currents 156 and 157 increase from negative values to positive values due to coupling to positive voltage at circuit node 110 through MOSFET 112. The arc of primary current 156 illustrates resonance between resonant capacitor 136 and resonant inductor 128. Prior to time 1, while primary current 156 is negative, the body diode of MOSFET 112 conducts and allows signal 154 to turn on MOSFET 112 under zero voltage switching (ZVS) conditions.

The difference between total primary current 156 and magnetizing current 157 is transferred to secondary winding 138. The reflected current in secondary winding 138 is illustrated as secondary current 158 in FIG. 2b. Secondary current 158 is determined based on a difference between primary current 156 and magnetizing current 157. The magnetizing current 157 portion of primary current 156 is used to magnetize core 137, while the remaining portion of primary current 156 is reflected as secondary current 158. Secondary current 158 is only illustrated as including positive values because negative current is rectified to positive voltage at circuit node 150 by diodes 142 and 144.

At time 2, signal 154 returns to ground voltage potential, shutting off MOSFET 112. Currents 156 and 157 reverse direction and the body diode of MOSFET 116 conducts to ground node 108. Currents 156 and 157 fall from a positive value to a negative value due to the coupling to ground node 108, mirroring the currents between time 0 and time 2. Signal 155 turns on MOSFET 116 at time 3, while primary current 156 remains positive, to achieve ZVS. Secondary current 158 includes a positive pulse between time 3 and time 5 due to rectification by diodes 142 and 144. Secondary current 158, which flows through either diode 142 or diode 144 to circuit node 150, charges capacitor 146 and powers a load attached between circuit nodes 150 and 152.

LLC resonant mode converters are commonly used for medium and high power converters because of high efficiency and power density. In higher power circuits, power factor correction (PFC) front-end circuitry is used to regulate the voltage potential of voltage source 106. LLC resonant mode converters are also used in some low power devices. LLC resonant mode convert 100 may be used without a PFC front-end in some embodiments, commonly low-power applications, to increase efficiency. However, without a PFC front-end, LLC resonant mode converter 100 receives a wide range of input voltages at circuit node 110. For instance, LLC resonant mode converter 100 may be plugged into a 120 Volt outlet in the United States, or a 230 Volt electrical outlet in Europe. Higher input voltages increase the maximum power output of LLC resonant mode converter 100. LLC resonant mode converter 100 can be designed to compensate for variable input voltage by limiting output power to an approximately constant value over a range of input voltages, referred to as over power protection (OPP). OPP systems for LLC resonant mode converter 100 limit the current through MOSFET 112, MOSFET 116, transformer 130, diode 142, diode 144, and other circuit elements at higher input voltages to protect the parts from overheating and damage.

One useful piece of information in OPP systems for LLC resonant mode converters is the input power of the converter. An input power calculation is performed to determine whether input power is over a threshold and should be reduced by the OPP system. However, calculating an accurate power input level of LLC resonant mode converter 100 while ignoring magnetizing current 157 through transformer 130 presents a challenge.

SUMMARY

A need exists for determining the input power of an LLC resonant mode converter. Accordingly, in one embodiment, the present disclosure is a method of generating a voltage signal comprising the steps of providing a power conversion circuit including a resonant capacitor, providing a first sample of a voltage potential of the resonant capacitor taken at a first time, providing a second sample of the voltage potential of the resonant capacitor taken at a second time, and determining a power level of the power conversion circuit based on a difference between the first sample and second sample.

In another embodiment, the present disclosure is a method of determining a power level of a power conversion circuit comprising the steps of taking a first sample of a voltage potential of a resonant capacitor at a first time, taking a second sample of the voltage potential of the resonant capacitor voltage at a second time, and determining an electric current based on the first sample and second sample.

In another embodiment, the present disclosure is a power conversion circuit comprising a split resonant capacitance. An analog-to-digital converter is configured to sample a voltage potential of the split resonant capacitance. An input power calculator is configured to determine a power level of the power conversion circuit based on the samples of the split resonant capacitance.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 3:
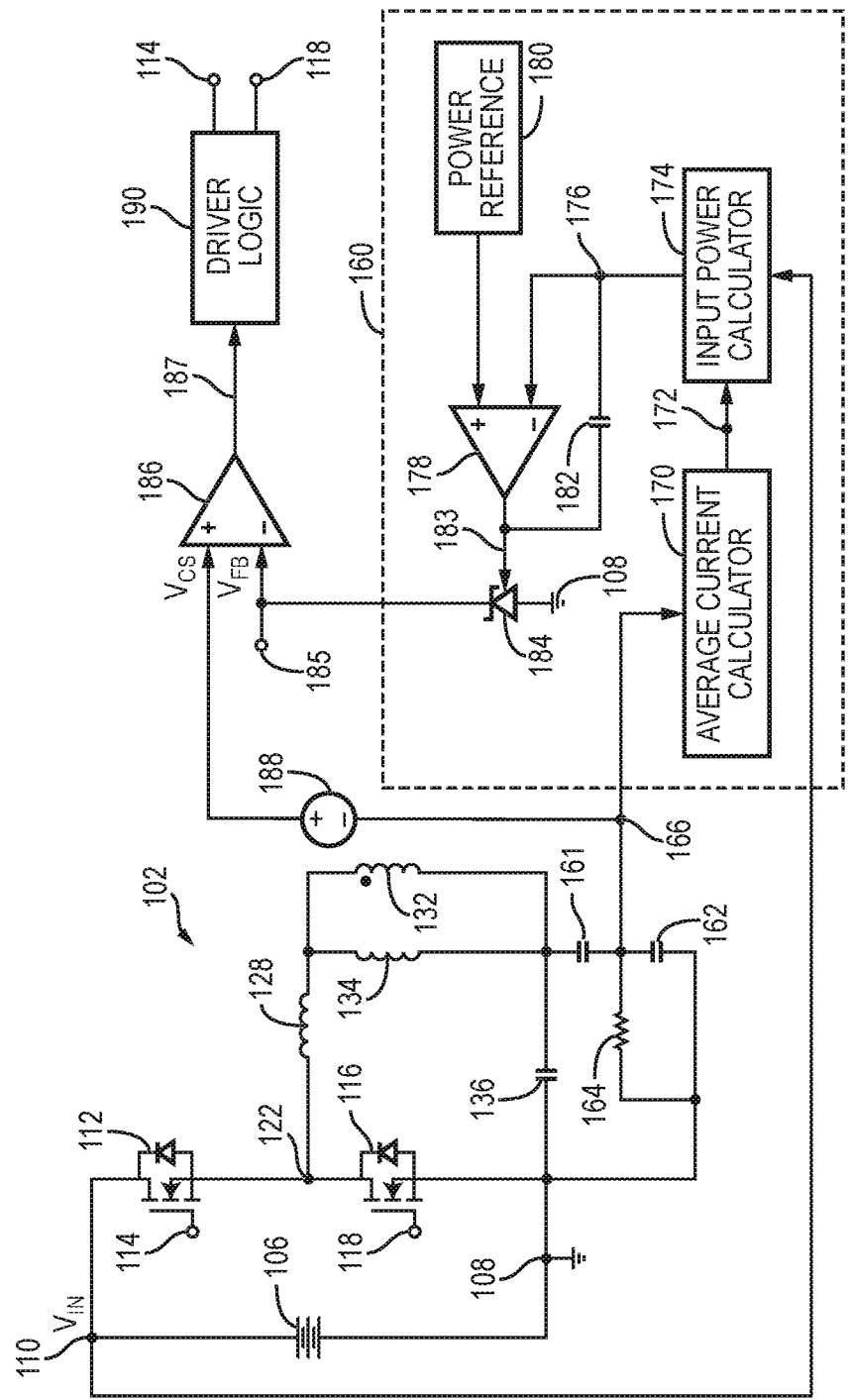
FIG. 3 illustrates a circuit and block diagram of an LLC resonant mode converter that includes an over power protection (OPP) circuit.

FIG. 3 illustrates primary side 102 of LLC resonant mode converter 100 with an over power protection (OPP) circuit 160. Capacitors 161 and 162 form a voltage divider in parallel with resonant capacitor 136. Capacitors 161 and 162 provide divided resonant capacitor voltage information at circuit node 166. A voltage divider using capacitors 161 and 162 is used to reduce the phase shift of the signal at circuit node 166 relative to using a voltage divider made of resistors, although a voltage divider of resistors is used in some embodiments.

Figure 1:
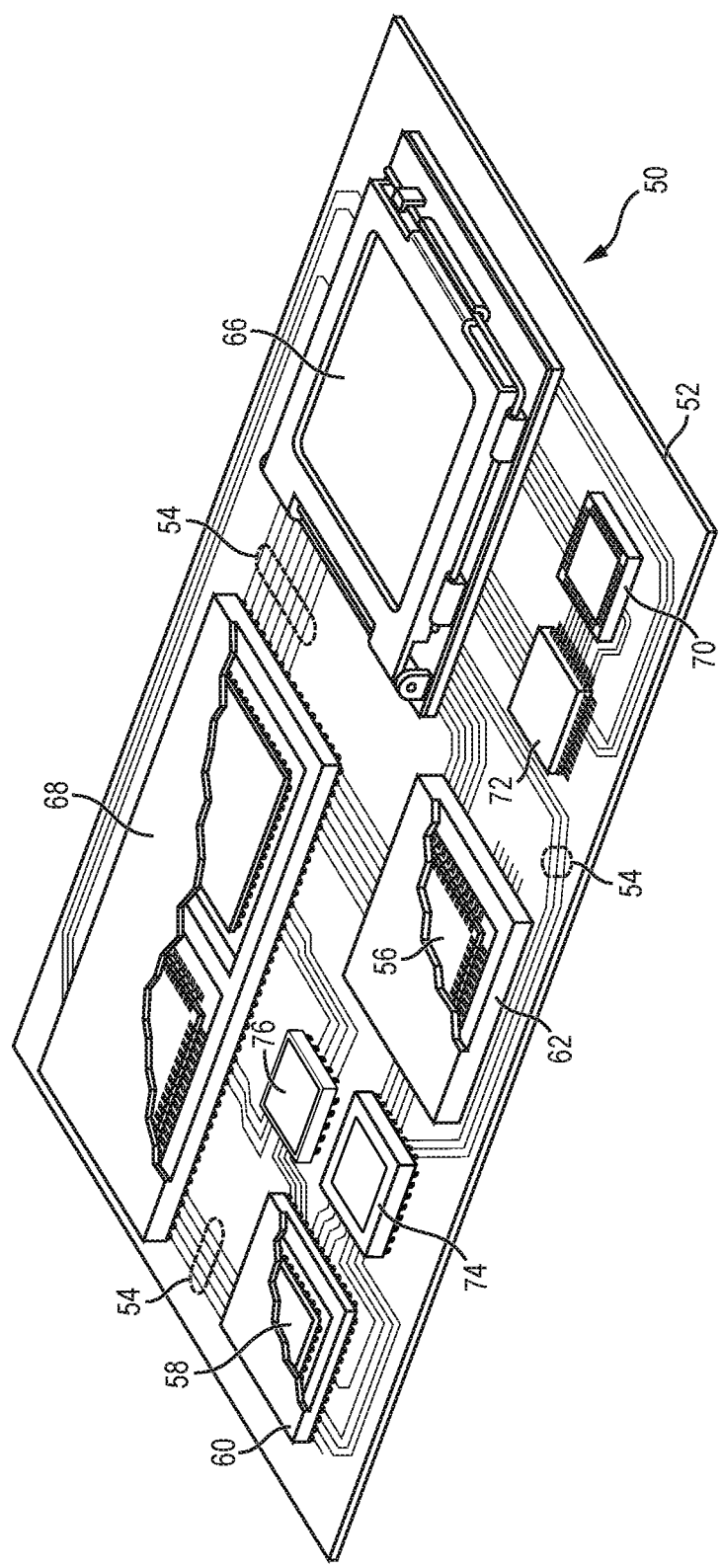
FIG. 1 illustrates an exemplary circuit board that uses an LLC resonant mode converter.
Figure 2A:
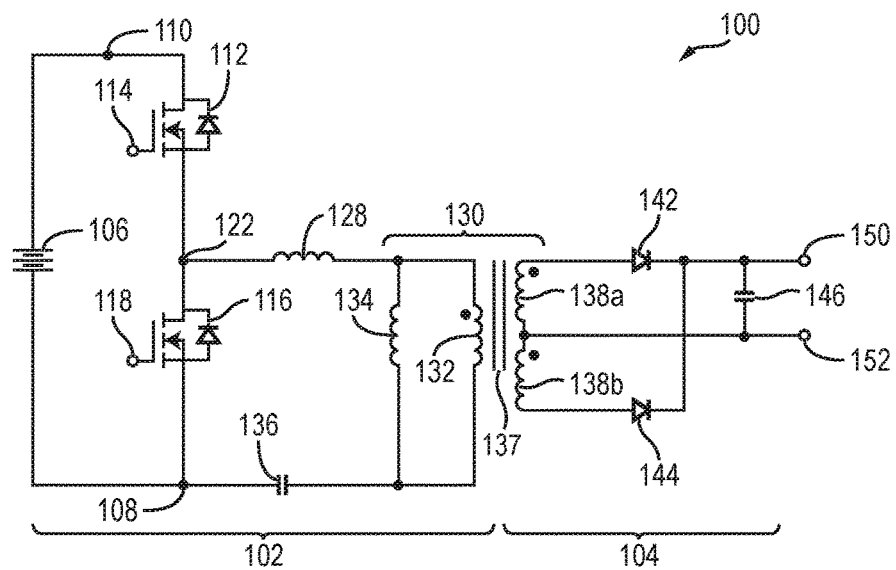
FIGS. 2a-2b illustrate an exemplary circuit diagram of the LLC resonant mode converter and operation of the converter.
Figure 2B:
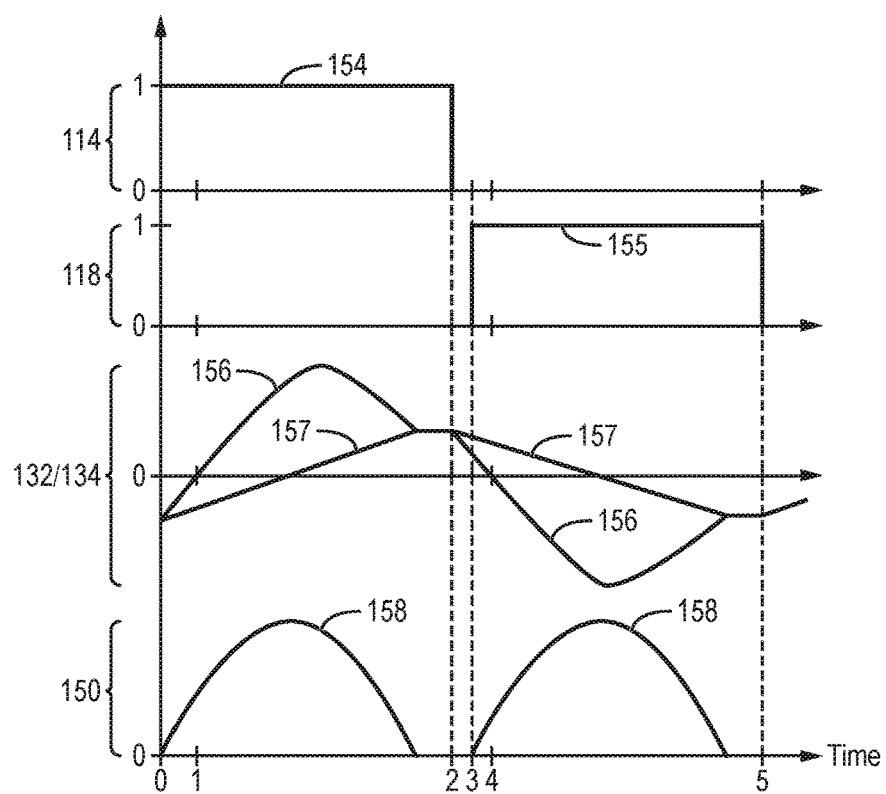

The divided voltage across resonant capacitor 136 at circuit node 166, referred to as $V_{CS}$, is supplied as an input to average current calculator 170. Average current calculator 170 samples the voltage potential at circuit node 166 to determine the average current through primary winding 132 while ignoring the current through magnetizing inductance 134, as explained in more detail with reference to subsequent figures. To ignore current through magnetizing inductance 134, average current calculator 170 takes a first sample of $V_{CS}$ at time 0 in FIG. 2b, at the rising edge of signal 154. Average current calculator 170 takes a second sample of $V_{CS}$ at time 2 in FIG. 2b, at the falling edge of signal 154. The difference between the first sample and second sample of $V_{CS}$ provides $\Delta V_{CS}$ during the on-time of MOSFET 112. Current through magnetizing inductance 134 is cancelled because the average magnitude of magnetizing current 157 during the MOSFET 112 on-time is approximately zero. Therefore, $\Delta V_{CS}$ over the MOSFET 112 on-time, from time 0 to time 2 in FIG. 2b, is approximately proportional to the average input current of LLC resonant mode converter 100 that is actually transferred to secondary side 104 and provided to a load.

Average current calculator 170 outputs a signal at circuit node 172 proportional to $\Delta V_{CS}$ divided by the on-time of MOSFET 112. Circuit node 172 contains an analog signal with a voltage potential representative of $\Delta V_{CS}$ over time in one embodiment. In other embodiments, circuit node 172 is a digital bus on an integrated circuit, or a hardware register value, that contains a digital value proportional to $\Delta V_{CS}$ over time. One formula for calculating electric power is given by the equation P=V*I, where P is electric power, V is voltage, and I is current. Input power calculator 174 calculates the input power of LLC resonant mode converter 100 by multiplying the average current value at circuit node 172 with the voltage potential received at circuit node 110.

In some embodiments, an analog multiplier is used to output an analog signal at circuit node 176 proportional to the power input of LLC resonant mode converter 100. In one embodiment, input power calculator 174 receives or determines a digital value proportional to the voltage at circuit node 110, and uses a microprocessor to multiply the digital voltage value with a digital current value received at circuit node 172. In other embodiments, average current calculator 170 and input power calculator 174 represent subroutines executing on a microprocessor, and circuit nodes 172 and 176 represent hardware registers or other memory elements that store variables representative of input current and power.

In some embodiments, input power calculator 174 introduces an offset to the power calculation output at circuit node 176. Adding an offset in input power calculator 174 allows the power level signal at circuit node 176 to compensate for inefficiencies in LLC resonant mode converter 100. The offset added by input power calculator 174 is a fixed value added to or subtracted from the input power calculation in some embodiments. In other embodiments, the offset is proportional to the input current, i.e., a larger offset is added by input power calculator 174 for larger input currents.

Input power calculator 174 outputs an analog or digital signal at circuit node 176 that is proportional to the input power of LLC resonant mode converter 100. Power reference 180 provides a signal that represents a desired value of circuit node 176. Comparator 178 receives the power level signal at circuit node 176 and power reference 180. As illustrated, comparator 178 is an operational amplifier (op-amp), with capacitor 182 provided as a feedback path to turn comparator 178 into an integrator. In other embodiments, power reference 180 and input power calculator 174 output digital values, and comparator 178 is a digital comparator or integrator. In one embodiment, comparator 178 is a software subroutine running on a microprocessor, and circuit node 176, power reference 180, and circuit node 183 are variables stored in hardware registers or other memory.

Figure 4:
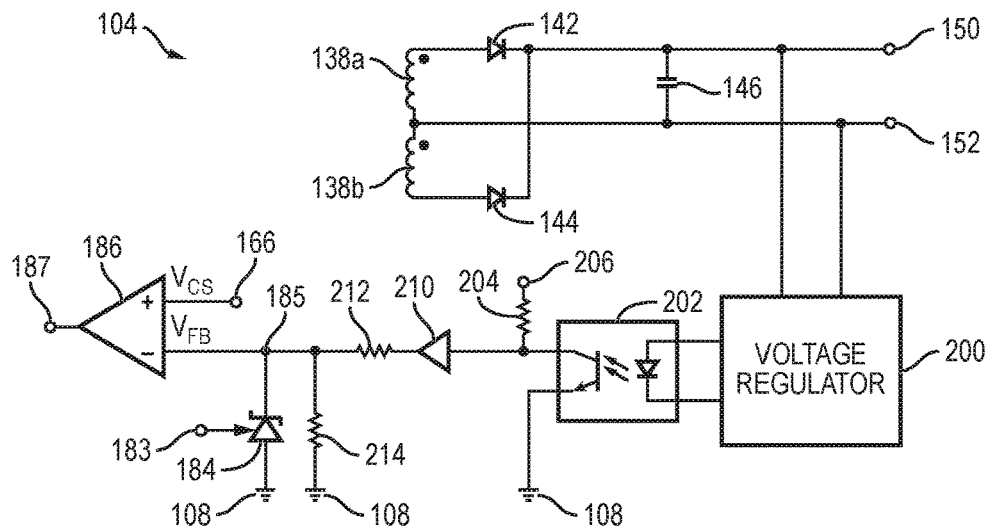
FIG. 4 illustrates limiting a feedback voltage using the OPP circuit.

Comparator 178 compares the signal from power reference 180 to the power level signal at circuit node 176, and generates an output at circuit node 183 indicating how far off the input power signal at circuit node 176 is from power reference 180. Circuit node 183 is coupled as an input to variable feedback clamp 184. Variable feedback clamp 184 clamps a feedback voltage, $V_{FB}$, at circuit node 185 to a maximum voltage potential dictated by a voltage potential at circuit node 183. In embodiments where circuit node 183 is a digital value, a digital-to-analog converter is coupled between comparator 178 and variable feedback clamp 184. In other embodiments, variable feedback clamp 184 is programmable with a digital value. Variable feedback clamp 184 is illustrated as a variable Zener diode used as a voltage clamp, but a variable current clamp is used in other embodiments. A feedback signal from secondary side 104 of LLC resonant mode converter 100 is generated as shown in FIG. 4 and received at circuit node 185. Variable feedback clamp 184 limits the voltage level of $V_{FB}$ by providing a shunt to ground node 108 on primary side 102.

An optional offset 188 is applied to the current sense voltage, $V_{CS}$, at circuit node 166, and then $V_{CS}$ is compared to $V_{FB}$ by comparator 186. The output of comparator 186 is routed via circuit node 187 to driver logic 190. Driver logic 190 is a controller that turns MOSFETs 112 and 116 on or off by toggling a voltage at gate terminals 114 and 118. In one embodiment, driver logic 190 is a block formed on a common IC with average current calculator 170 and input power calculator 174. In some embodiments, an additional half-bridge driver is used between driver logic 190 and MOSFETs 112 and 116.

Driver logic 190 turns off MOSFET 112 when $V_{CS}$ exceeds $V_{FB}$, at time 2 in FIG. 2b. The on-time of MOSFET 112 is terminated earlier when $V_{FB}$ is reduced, which reduces power transfer through transformer 130. $V_{FB}$ is normally reduced from secondary side 104, as shown in FIG. 4, when a desired voltage at output circuit node 150 is reached or exceeded. $V_{FB}$ is reduced artificially from primary side 102 using variable feedback clamp 184 when output power exceeds desired levels as determined by OPP 160. A reduced $V_{FB}$ reduces the on-time of MOSFET 112, which reduces power transfer through transformer 130 to secondary side 104 and limits total input power.

FIG. 4 illustrates generation of $V_{FB}$ at circuit node 185 from secondary side 104. A voltage regulator 200 is coupled to circuit nodes 150 and 152 to detect an output voltage of LLC resonant mode converter 100. As a load on LLC resonant mode converter 100 increases, the voltage at circuit node 150 drops due to current through the load discharging capacitor 146. Voltage regulator 200 turns off optocoupler 202 so that the input of buffer 210 is not significantly coupled to ground node 108 through optocoupler 202. The input of buffer 210 is coupled to $V_{cc}$ node 206 through pull-up resistor 204 rather than being coupled to ground node 108 through optocoupler 202. Buffer 210 outputs a positive voltage, and the feedback voltage at circuit node 185 is near a maximum $V_{FB}$ potential. Resistors 212 and 214 form a voltage divider to reduce the voltage potential output by buffer 210. Variable feedback clamp 184 further reduces the feedback voltage potential at circuit node 185 as dictated by OPP 160. Increasing $V_{FB}$ at circuit node 185 by turning off optocoupler 202 increases power transfer through transformer 130 to boost the output voltage potential at circuit node 150.

Once the voltage potential at output circuit node 150 increases to reach or exceed a desired output voltage potential, voltage regulator 200 turns on optocoupler 202 to couple the input of buffer 210 to ground node 108 through the optocoupler. $V_{FB}$ at circuit node 185 is reduced, which reduces the on-time of MOSFET 112 and the amount of power transferred through transformer 130 to secondary side 104. Voltage regulator 200 increases or decreases power transfer through transformer 130 to keep output circuit node 150 at approximately a desired voltage potential.

The control signal at circuit node 183, generated by OPP 160, limits the amount of power that is transferred when voltage regulator 200 turns off optocoupler 202. Limiting power output to a desired level protects MOSFET 112, MOSFET 116, transformer 130, diodes 142 and 144, and other parts of LLC resonant mode converter 100 from overheating and potentially from damage to the components. Without OPP 160, the maximum power output of LLC resonant mode converter 100 increases with input voltage. LLC resonant mode converter 100 might be calibrated to have a desired maximum power output, e.g., 100 Watts, at 120 Volt input, but might be capable of outputting 200 Watts of power at 230 Volt input which could overheat or damage the converter. OPP 160 limits output power of LLC resonant mode converter 100 to an approximately constant maximum value over a range of input voltages.

Figure 5:
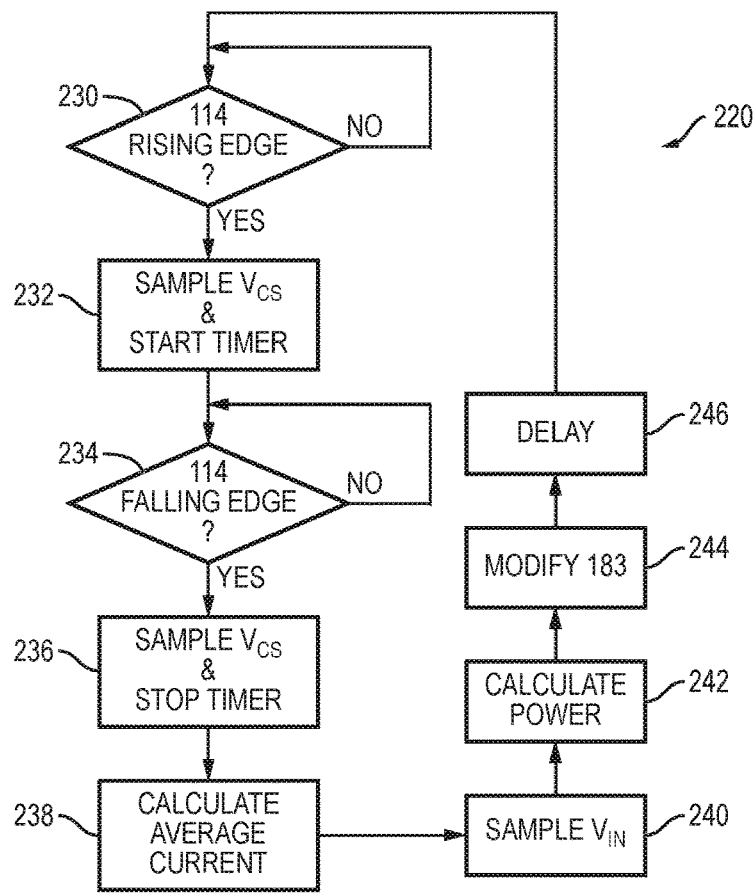
FIG. 5 illustrates a flow chart for implementing the OPP circuit.

FIG. 5 illustrates a flow chart 220 for calculating output power of LLC resonant mode converter 100 using OPP 160. Flow chart 220 is implemented as microprocessor code embodying average current calculator 170 and input power calculator 174. In other embodiments, flow chart 220 is implemented in hardware as a digital finite state machine.

At step 230, average current calculator 170 waits for a rising edge of the control signal at gate terminal 114 of MOSFET 112, indicating that MOSFET 112 was turned on. Flow chart 220 advances to step 232 at the rising edge of gate terminal 114. In step 232, average current calculator 170 takes a sample of a voltage potential at $V_{CS}$ node 166 and starts a timing circuit to measure the length of time that gate terminal 114 remains high.

After sampling $V_{CS}$ node 166 and starting the timer, OPP 160 advances to step 234, which is to wait for a falling edge of the voltage potential at gate terminal 114. Flow chart 220 remains in step 234 until the falling edge of gate terminal 114 is detected, at which time step 236 is reached. In step 236, OPP 160 takes a second sample of $V_{CS}$ and stops the timer. After step 236, OPP 160 has determined three variables: the voltage potential of $V_{CS}$ when MOSFET 112 was turned on, the voltage potential of $V_{CS}$ when MOSFET 112 was turned off, and the amount of time that MOSFET 112 was turned on. Those three variables are stored in three different hardware registers or other memory in one embodiment. In another embodiment, the three variables exist as three different analog voltage on three circuit nodes.

At step 238, average current calculator 170 uses the three variables to calculate average input current. Average current is calculated based on $\Delta V_{CS}$, i.e., the difference between the two samples of $V_{CS}$ node 166, divided by the time between the two samples. The average current calculated by average current calculator 170 in step 238 is stored in a variable for use by input power calculator 174 in steps 240-242.

At step 240, input power calculator 174 takes a sample of the input voltage at circuit node 110. Input power calculator 174 samples circuit node 110 simultaneously with the first or second sample of $V_{CS}$ node 166 in some embodiments. In other embodiments, the sample of input voltage at circuit node 110 is taken between $V_{CS}$ samples, before the first $V_{CS}$ sample, or after the second sample of $V_{CS}$. In some executions of flow chart 220, input power calculator 174 does not sample input voltage at circuit node 110 and instead uses a previously sampled value.

At step 242, input power calculator 174 calculates the input power of LLC resonant mode converter 100 by multiplying the average current calculated at step 238 with the voltage detected at step 240. At step 244, the value at circuit node 183 is modified by comparator 178. Comparator 178 represents a calculation performed by a microprocessor, and circuit node 183 represents a digital value stored in a variable as a result of the calculation. A digital-to-analog converter outputs an analog value proportional to the stored digital value to variable feedback clamp 184. In other embodiments, an op-amp is used for comparator 178 and circuit node 183 contains an analog value output from the op-amp.

The result of step 244 is a reduction in the voltage potential at $V_{FB}$ node 185 if input power to LLC resonant mode converter 100 exceeds a threshold. The reduction of $V_{FB}$ decreases on-time of MOSFET 112 in subsequent power transfer cycles, and thus reduces the power transferred through transformer 130 to secondary side 104. The controller of LLC resonant mode converter 100, e.g., driver logic 190, uses the same on-time for MOSFET 116 as MOSFET 112 in some embodiments. State 246 represents an optional delay between subsequent executions of flow chart 220. OPP 160 recalculates input power every 100 milliseconds, every second, every desired number of pulses of gate terminal 114, or any other appropriate amount of delay time in various embodiments. In some embodiments, OPP 160 recalculates input power every pulse of gate terminal 114. In other embodiments, OPP 160 calculates input power on pulses of gate terminal 118, or based on transitions of HB node 122.

Figure 6A:
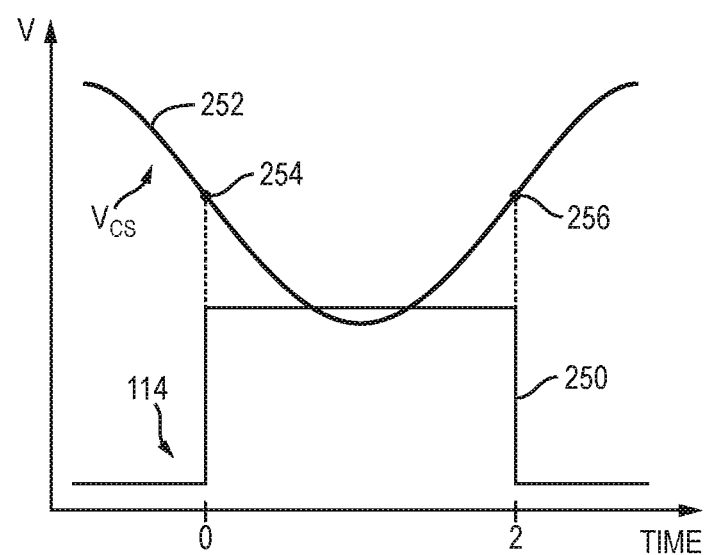
FIGS. 6a-6b illustrate determining output power by sampling current-sense voltage.
Figure 6B:
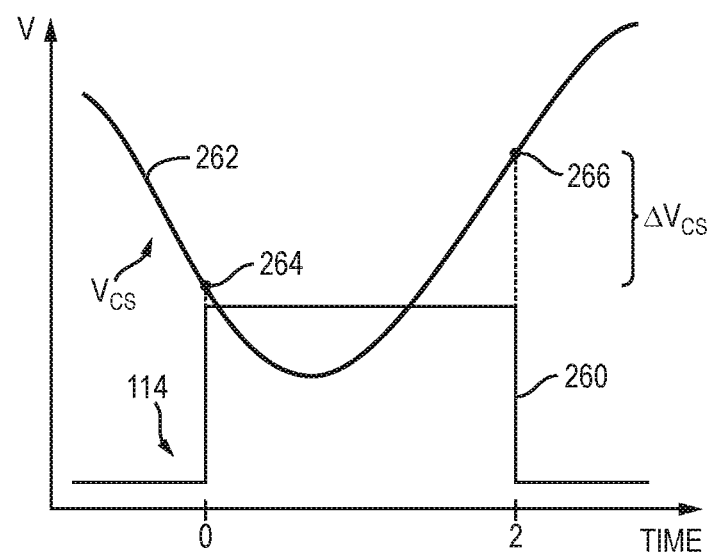

FIGS. 6a and 6b illustrate voltage potential at $V_{CS}$ node 166 superimposed on the signal at gate terminal 114. FIG. 6a illustrates control signal 250, which is applied to gate terminal 114 of MOSFET 112, and $V_{CS}$ signal 252 with substantially no load on LLC resonant mode converter 100. Per flow chart 220 in FIG. 5, a first sample 254 of $V_{CS}$ signal 252 is triggered by the rising edge of signal 250 at time 0. A second sample 256 of $V_{CS}$ signal 252 is triggered by the falling edge of signal 250 at time 2. Without a significant load on LLC resonant mode converter 100, the voltage potential of sample 254 is approximately equal to the voltage potential of sample 256.

Because negligible power is transferred from primary side 102 to secondary side 104 through transformer 130 during the on-time of MOSFET 112, magnetizing current 157 is the only significant component affecting $V_{CS}$. As illustrated by magnetizing current 157 in FIG. 2b, magnetizing current is approximately symmetrical around the zero axis during the on-time of MOSFET 112. Magnetizing current 157 causes no significant net change in $V_{CS}$ voltage potential during the MOSFET 112 on-time. Some charge is removed from resonant capacitor 136 while the magnetizing current is negative, and an approximately equal amount of charge is returned to resonant capacitor 136 when the magnetizing current is positive. With no load on LLC resonant mode converter 100, there is a negligible voltage difference between sample 254 and sample 256.

FIG. 6b illustrates control signal 260, which is applied to gate terminal 114 of MOSFET 112, and $V_{CS}$ signal 262 with a heavy load on LLC resonant mode converter 100. Sample 264 of $V_{CS}$ signal 262 is taken at time 0, per steps 230-232 of flow chart 220. Sample 266 of $V_{CS}$ signal 262 is taken at time 2, per steps 234-236 of flow chart 220. With a heavy load on LLC resonant mode converter 100, $V_{CS}$ is affected by current through primary winding 132 in addition to magnetizing current 157. The total current through primary winding 132 and magnetizing inductance 134 is illustrated as primary current 156 in FIG. 2b. Primary current 156 illustrates that total current of the LLC tank is positive for significantly longer than the current is negative between time 0 and time 2.

The heavy load on LLC resonant mode converter 100 in FIG. 6b, which increases primary current 156 beyond simply magnetizing current 157, results in $V_{CS}$ signal 262 having a higher voltage potential for sample 266 than for sample 264. $\Delta V_{CS}$ represents the net charge difference on resonant capacitor 136 during the on-time of MOSFET 112. By dividing the charge difference over the on-time of MOSFET 112, an average current is obtained. Sampling $V_{CS}$ node 166 at the beginning and end of the MOSFET 112 on-time substantially negates the effect of magnetizing current 157 on the power calculation by OPP 160.

Figure 7:
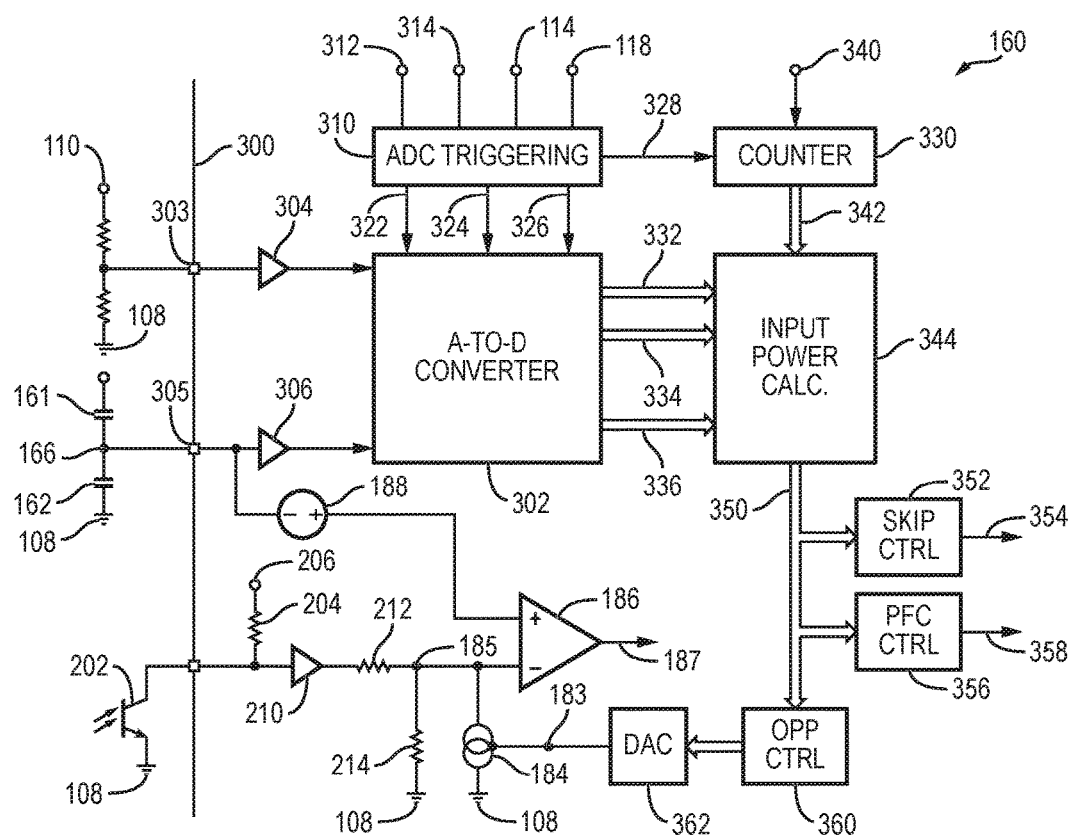
FIG. 7 illustrates an integrated circuit with a digitally implemented OPP circuit.

FIG. 7 illustrates a digital IC implementation of OPP 160. Line 300 demarcates between on-chip components and off-chip components. In other embodiments, the various components of LLC resonant mode converter 100 and OPP 160 can be either on or off the integrated circuit. An analog-to-digital converter (ADC) 302 receives a signal proportional to input voltage through IC input terminal 303 and buffer 304. ADC 302 receives the current sense voltage from $V_{CS}$ node 166 through IC input terminal 305 and buffer 306.

An ADC triggering block 310 receives signals 312, 314, 114, and 118 as inputs, and triggers samples of $V_{CS}$ and $V_{IN}$ by ADC 302 using sample triggering signals 322, 324, and 326. An additional output 328 of ADC triggering block 310 causes counter 330 to count while MOSFET 112 is turned on. Input signal 312 is a signal that pulses on rising edges of the voltage at HB node 122. Input signal 314 is a signal that pulses on falling edges of voltage at HB node 122. Input signals 114 and 118 are control signals that control MOSFETs 112 and 116, respectively.

ADC triggering block 310 triggers ADC 302 to take samples of $V_{CS}$ and $V_{IN}$ according to flow chart 220 of FIG. 5. The timing can be based only on the control signal 114 input, only the input signals 312 and 314, or any combination of input signals 312, 314, 114, and 118. ADC triggering block 310 adds or subtracts delay between the input signals and the output triggering signals as needed to compensate for delay in the system to trigger sampling by ADC 302 at the edge of the signal at gate terminal 114 of MOSFET 112. In other embodiments, samples are taken at the edges of gate terminal 118 or HB node 122.

Sample triggering signal 322 causes ADC 302 to take a digital sample of $V_{CS}$ node 166 and store the sample in a register output as digital $V_{CS}$ sample 332 at time 0, i.e., the rising edge of gate terminal 114. Sample triggering signal 324 causes ADC 302 to take a digital sample of $V_{CS}$ node 166 and store the sample in a register output as digital $V_{CS}$ sample 334 at time 2, i.e., the falling edge of gate terminal 114. Sample triggering signal 326 causes ADC 302 to take a digital sample of $V_{IN}$ and store the sample in a register output as digital $V_{IN}$ sample 336 at any appropriate time. Sample triggering signals 322, 324, and 326 cause ADC 302 to take a sample at edges of the triggering signals, or based on a value of the triggering signals. ADC 302 can be triggered to take $V_{CS}$ sample 332 shortly before, during, or shortly after transitions of HB node 122 from low to high. ADC 302 can be triggered to take $V_{CS}$ sample 334 shortly before, during, or shortly after transitions of HB node 122 from high to low.

Counter 330 is a digital counter that receives control signal 328 from ADC triggering block 310, and counts up for the on-time of MOSFET 112 using system clock input 340. After a falling edge of the control signal at gate terminal 114, the on-time of MOSFET 112 is output by counter 330 as $T_{ON}$ 342. In some embodiments, an analog timer is used instead of counter 330. A capacitor is charged or discharged at an approximately constant rate while MOSFET 112 is turned on. Measuring a voltage potential difference of the capacitor between when MOSFET 112 turns on and when MOSFET 112 turns off indicates the length of time that MOSFET 112 was on based on an approximately constant rate of voltage potential change. Other types of timing circuits besides digital counter 330 or an analog timer are used in other embodiments.

Input power calculation block 344 receives first $V_{CS}$ sample 332, second $V_{CS}$ sample 334, $V_{IN}$ sample 336, and $T_{ON}$ 342. Input power calculation block 344 generates a value for the present power output of LLC resonant mode converter 100 based on equation 1 below.

$$(V_{CS} \text{ Sample 334} - V_{CS} \text{ Sample 332}) * V_{IN} \text{ Sample 336} / T_{ON} 342 \quad \text{Equation(1):}$$

In equation 1, subtracting $V_{CS}$ sample 332 from $V_{CS}$ sample 334 yields a net amount of charge removed from or added to resonant capacitor 136. Dividing by $T_{ON}$ 342 converts the net charge to an average electric current. Multiplying by $V_{IN}$ sample 336 converts the current to a power value. Input power calculation block 344 outputs a digital value representative of the power input to LLC resonant mode converter 100 as input power data 350.

Input power data 350 is routed to skip control block 352, which generates a skip control signal 354. Skip control block 352 uses skip control signal 354 to initiate skip mode. Skip mode is used to skip some power transfer cycles of LLC resonant mode converter 100 in low power situations to conserve energy. Skip control signal 354 is routed to the controller that generates signals to gate terminal 114 and gate terminal 118, e.g., driver logic 190, to tell the controller to initiate skip mode. Skip control block 352 is not used in all embodiments.

Input power data 350 is routed to PFC control block 356. PFC control block 356 generates PFC control signal 358. PFC control signal 358 is routed to enable or disable a PFC front end. In some embodiments, PFC control block 356 disables the PFC front end when input power is below a threshold to conserve energy. PFC control block 356 is not used in all embodiments.

Input power data 350 is routed to OPP control block 360. OPP control block 360 includes the functionality of comparator 178 in FIG. 3. OPP control block 360 outputs a digital value indicative of the calculated input power relative to a reference maximum power value. Digital-to-analog converter 362 converts the digital value from OPP control block 360 to an analog value on circuit node 183. Circuit node 183 biases variable feedback clamp 184 to reduce the voltage potential at circuit node 185 as input power increases above a desired maximum.

OPP 160 is implemented on an integrated circuit while only requiring inputs for $V_{FB}$, $V_{IN}$, and $V_{CS}$. Control of OPP 160 is implemented by a microprocessor executing code, or by a state machine triggered by the control signals of MOSFETs 112 and 116. OPP 160 calculates average input current by taking two samples of a current sense voltage and dividing over time. Sampling $V_{CS}$ during turn-on and turn-off events, and calculating a slope defined by the two sampling points, cancels the magnetizing current component to ascertain average input current. Average input current information is multiplied with input voltage to get input power. Input power is limited to a reference level by reducing a feedback voltage via variable feedback clamp 184. Additional linear compensation is used in some embodiments to cancel differences between input power and output power caused by application inefficiency.

While one or more embodiments have been illustrated and described in detail, the skilled artisan will appreciate that modifications and adaptations to those embodiments may be made without departing from the scope of the present disclosure.

What is claimed:

1. A power conversion circuit, comprising:
   an average current circuit including an input coupled for receiving a sampling signal representative of a current through a primary winding, wherein the average current circuit measures the sampling signal at a first time and a second time;
   a power level circuit including a first input coupled to an output of the average current circuit and a second input coupled for receiving an input voltage of the power conversion circuit to determine an input power of the power conversion circuit as a product of the input voltage and a difference between the measurements of the sampling signal at the first time and second time;
   a first amplifier including a first input coupled for receiving a power reference and a second input coupled to an output of the power level circuit;
   a variable feedback clamp including a control input coupled to an output of the first amplifier; and
   a second amplifier including a first input coupled for receiving the sampling signal and a second input coupled to the variable feedback clamp and further coupled for receiving a feedback signal of the power conversion circuit.

2. The power conversion circuit of claim 1, further including:
   a first power transistor including a first conduction terminal coupled for receiving the input voltage, a second conduction terminal coupled to the primary winding, and a control input coupled to an output of the second amplifier; and
   a second power transistor including a first conduction terminal coupled to the second conduction terminal of the first transistor, a second conduction terminal coupled to a ground terminal, and a control input coupled to the output of the second amplifier.

3. The power conversion circuit of claim 2, further including a driver logic circuit including an input coupled to the output of the second amplifier, a first output coupled to the control input of the first power transistor, and a second output coupled to the control input of the second power transistor.

4. The power conversion circuit of claim 1, further including a voltage offset circuit coupled between the sampling signal and the first input of the second amplifier.

5. The power conversion circuit of claim 1, further including:
a first circuit node adapted for coupling to the primary winding of the power conversion circuit;
a resonant capacitor coupled between the first circuit node and a ground terminal;
a first capacitor coupled between the first circuit node and a second circuit node; and
a second capacitor coupled between the second circuit node and ground terminal, wherein the second circuit node provides the sampling signal.

6. The power conversion circuit of claim 5, further including a resistor coupled between the second circuit node and the ground terminal.

7. A power conversion circuit, comprising:
an average current circuit including an input coupled for receiving a sampling signal representative of a current through a primary winding, wherein the average current circuit measures the sampling signal at a first time and a second time; and
a power level circuit including a first input coupled to an output of the average current circuit and a second input coupled for receiving an input voltage of the power conversion circuit to determine an input power of the power conversion circuit as a product of the input voltage and a difference between the measurements of the sampling signal at the first time and second time.

8. The power conversion circuit of claim 7, further including a first amplifier including a first input coupled for receiving a power reference and a second input coupled to an output of the power level circuit.

9. The power conversion circuit of claim 8, further including:
a variable feedback clamp including a control input coupled to an output of the first amplifier; and
a second amplifier including a first input coupled for receiving the sampling signal and a second input coupled to the variable feedback clamp and further coupled for receiving a feedback signal of the power conversion circuit.

10. The power conversion circuit of claim 9, further including:
a first power transistor including a first conduction terminal coupled for receiving the input voltage, a second conduction terminal coupled to the primary winding, and a control input coupled to an output of the second amplifier; and
a second power transistor including a first conduction terminal coupled to the second conduction terminal of the first transistor, a second conduction terminal coupled to a ground terminal, and a control input coupled to the output of the second amplifier.

11. The power conversion circuit of claim 10, further including a driver logic circuit including an input coupled to the output of the second amplifier, a first output coupled to the control input of the first power transistor, and a second output coupled to the control input of the second power transistor.

12. The power conversion circuit of claim 9, further including a voltage offset circuit coupled between the sampling signal and the first input of the second amplifier.

13. The power conversion circuit of claim 7, further including:
a first circuit node adapted for coupling to the primary winding of the power conversion circuit;
a resonant capacitor coupled between the first circuit node and a ground terminal;
a first capacitor coupled between the first circuit node and a second circuit node; and
a second capacitor coupled between the second circuit node and ground terminal, wherein the second circuit node provides the sampling signal.

14. A method of determining an input power for a power conversion circuit, comprising:
measuring a sampling signal representative of a current through a primary winding at a first time and a second time; and
determining the input power as a product of an input voltage of the power conversion circuit and a difference between the measurements of the sampling signal at the first time and second time.

15. The method of claim 14, further including comparing the determined input power and a power reference.

16. The method of claim 15, further including clamping a feedback signal of the power conversion circuit in response to comparing the determined input power and the power reference.

17. The power conversion circuit of claim 16, further including comparing the sampling signal to the clamped feedback signal.

18. The power conversion circuit of claim 17, further including controlling a power transistor in response to comparing the sampling signal to the clamped feedback signal.

19. The method of claim 14, further including sensing the current through the primary winding as a voltage across a resonant capacitor.

20. The method of claim 19, further including dividing down the voltage across the resonant capacitor as the sampling signal.

* * * * *